United States Patent
Kleen et al.

(10) Patent No.: US 10,944,269 B2
(45) Date of Patent: Mar. 9, 2021

(54) SYSTEMS AND METHODS FOR FIRST TIME SYNCHRONIZATION OF A GENERATOR WITH AN ELECTRICAL GRID

(71) Applicant: General Electric Company, Schenectady, NY (US)

(72) Inventors: Randall John Kleen, Houston, TX (US); Michael Acosta, Houston, TX (US); Roland Hug, Baden (CH)

(73) Assignee: General Electric Company, Schenectady, NY (US)

( * ) Notice: Subject to any disclaimer, the term of this patent is extended or adjusted under 35 U.S.C. 154(b) by 197 days.

(21) Appl. No.: 16/011,973

(22) Filed: Jun. 19, 2018

(65) Prior Publication Data
US 2019/0027939 A1 Jan. 24, 2019

(30) Foreign Application Priority Data
Jul. 18, 2017 (EP) .................................. 17181812

(51) Int. Cl.
*H02J 1/00* (2006.01)
*H02J 3/00* (2006.01)
(Continued)

(52) U.S. Cl.
CPC .............. *H02J 3/40* (2013.01); *F01D 15/10* (2013.01); *H02J 3/18* (2013.01); *F05D 2220/31* (2013.01);
(Continued)

(58) Field of Classification Search
CPC .... H02J 3/40; H02J 3/382; H02J 3/383; H02J 3/385; H02J 3/386; H02J 3/387;
(Continued)

(56) References Cited

U.S. PATENT DOCUMENTS 4,031,407 A 6/1977 Reed
5,640,060 A 6/1997 Dickson
(Continued)

FOREIGN PATENT DOCUMENTS

DE 41 01 821 A1 7/1992
DE 102018117225 A1 1/2019
EP 3432438 A1 1/2019

OTHER PUBLICATIONS

Extended European Search Report and Opinion issued in connection with corresponding EP Application No. 17181812.3 dated Sep. 20, 2017.
(Continued)

*Primary Examiner* — Rexford N Barnie
*Assistant Examiner* — Rasem Mourad
(74) *Attorney, Agent, or Firm* — James Pemrick; Hoffman Warnick LLC

(57) ABSTRACT

Systems and methods for first time synchronization of a generator with an electrical grid are disclosed. According to one embodiment of the disclosure, a method of first time synchronization of a generator with an electrical grid can be provided. The method may include receiving, during an acceleration of a turbine, a voltage of a generator and a voltage of an electrical grid; receiving, during an acceleration of a turbine, a frequency of the generator and a frequency of the electrical grid; receiving, during an acceleration of a turbine, one or more phase angles of the generator and one or more phase angles of the electrical grid; when the frequency of the generator matches with the frequency of the electrical grid, at least one of the one or more phase angles of the generator match with the respective at least one of the one or more phase angles of the electrical grid, and the difference between the voltage of the generator and the voltage of the electrical grid reaches a threshold voltage difference, synchronizing the generator to
(Continued)

the electrical grid by closing a generator breaker or by closing a line breaker. The method may further include: determining the generator is synchronized to the electrical grid; and increasing the voltage of the generator to match the voltage of the electrical grid.

20 Claims, 6 Drawing Sheets

(51) Int. Cl.
    *H02J 3/40*     (2006.01)
    *F01D 15/10*     (2006.01)
    *H02J 3/18*     (2006.01)

(52) U.S. Cl.
    CPC ...... *F05D 2220/32* (2013.01); *F05D 2220/76* (2013.01)

(58) Field of Classification Search
    CPC . H02J 13/0006; H02J 3/18; H02J 3/42; F01D 15/10; F05D 2220/76; F05D 2220/32; F05D 2220/31; Y10T 307/735
    See application file for complete search history.

(56) References Cited

U.S. PATENT DOCUMENTS

| | | | |
|---|---|---|---|
| 2011/0163607 A1* | 7/2011 | Schuette | H02J 3/42 307/87 |
| 2012/0106140 A1* | 5/2012 | Sun | F21V 3/00 362/158 |
| 2013/0119769 A1* | 5/2013 | Johnson | H02J 3/38 307/68 |
| 2014/0123664 A1* | 5/2014 | Dion Ouellet | F02C 7/26 60/773 |
| 2019/0214827 A1* | 7/2019 | Johnson, Jr. | H02J 3/28 |

OTHER PUBLICATIONS

Thompson, Michael J., Fundamentals and Advancements in Generator Synchronizing Systems, Synchronous Generator Protection and Control: A Collection of Technical Papers Representing Modern Solutions, 2019, 15 pages.

* cited by examiner

SYSTEMS AND METHODS FOR FIRST TIME SYNCHRONIZATION OF A GENERATOR WITH AN ELECTRICAL GRID

TECHNICAL FIELD

Embodiments of this disclosure generally relate to power systems, and more specifically, to systems and methods for first time synchronization of a generator with an electrical grid.

BACKGROUND

A power plant system can include one or more turbines, such as, for example, a gas turbine or a steam turbine. The turbine may be connected to a generator that can transmit power from the turbine to an electrical grid. During startup and acceleration of the turbine, the generator associated with the turbine may need to be synchronized with the electrical grid before power transmission can occur.

During first time synchronization of the generator with the electrical grid, for example, during first startup and commissioning, large fault torques may develop. Large fault torques can damage generator shafts and may be expensive to repair or replace. Plant designers may add additional margin in design of generator shafts.

BRIEF DESCRIPTION OF THE DISCLOSURE

Some or all of the above needs and/or problems may be addressed by certain embodiments of the disclosure. Certain embodiments may include systems and methods for first time synchronization of a generator with an electrical grid. According to one embodiment of the disclosure, a method of first time synchronization of a generator with an electrical grid can be provided. The method may include receiving, during an acceleration of a turbine, a voltage of a generator and a voltage of an electrical grid; receiving, during an acceleration of a turbine, a frequency of the generator and a frequency of the electrical grid; receiving, during an acceleration of a turbine, one or more phase angles of the generator and one or more phase angles of the electrical grid. The method may further include: when the frequency of the generator matches with the frequency of the electrical grid, at least one of the one or more phase angles of the generator match with the respective at least one of the one or more phase angles of the electrical grid, and the difference between the voltage of the generator and the voltage of the electrical grid reaches a threshold voltage difference, synchronizing the generator to the electrical grid by closing a generator breaker or by closing a line breaker. The method may further include determining whether the generator may be synchronized to the electrical grid; and increasing the voltage of the generator to match the voltage of the electrical grid.

According to another embodiment of the disclosure, a system can be provided. The system can include a controller. The system can also include a memory with instructions executable by a computer for performing operations that can include: receiving, during an acceleration of a turbine, a voltage of a generator and a voltage of an electrical grid; receiving, during an acceleration of a turbine, a frequency of the generator and a frequency of the electrical grid; receiving, during an acceleration of a turbine, one or more phase angles of the generator and one or more phase angles of the electrical grid; when the frequency of the generator matches with the frequency of the electrical grid, at least one of the one or more phase angles of the generator match with the respective at least one of the one or more phase angles of the electrical grid, and the difference between the voltage of the generator and the voltage of the electrical grid reaches a threshold voltage difference, synchronizing the generator to the electrical grid by closing a generator breaker or by closing a line breaker; determining whether the generator may be synchronized to the electrical grid; and increasing the voltage of the generator to match the voltage of the electrical grid.

According to another embodiment of the disclosure, a non-transitory computer-readable medium can be provided. The non-transitory computer-readable medium can include instructions executable by a computer for performing operations that can include, receiving, during an acceleration of a turbine, a voltage of a generator and a voltage of an electrical grid; receiving, during an acceleration of a turbine, a frequency of the generator and a frequency of the electrical grid; receiving, during an acceleration of a turbine, one or more phase angles of the generator and one or more phase angles of the electrical grid; when the frequency of the generator matches with the frequency of the electrical grid, at least one of the one or more phase angles of the generator match with the respective at least one of the one or more phase angles of the electrical grid, and the difference between the voltage of the generator and the voltage of the electrical grid reaches a threshold voltage difference, synchronizing the generator to the electrical grid by closing a generator breaker or by closing a line breaker; determining whether the generator may be synchronized to the electrical grid; and increasing the voltage of the generator to match the voltage of the electrical grid.

Other embodiments, features, and aspects of the disclosure will become apparent from the following description taken in conjunction with the following drawings.

BRIEF DESCRIPTION OF THE DRAWINGS

Figure 1:
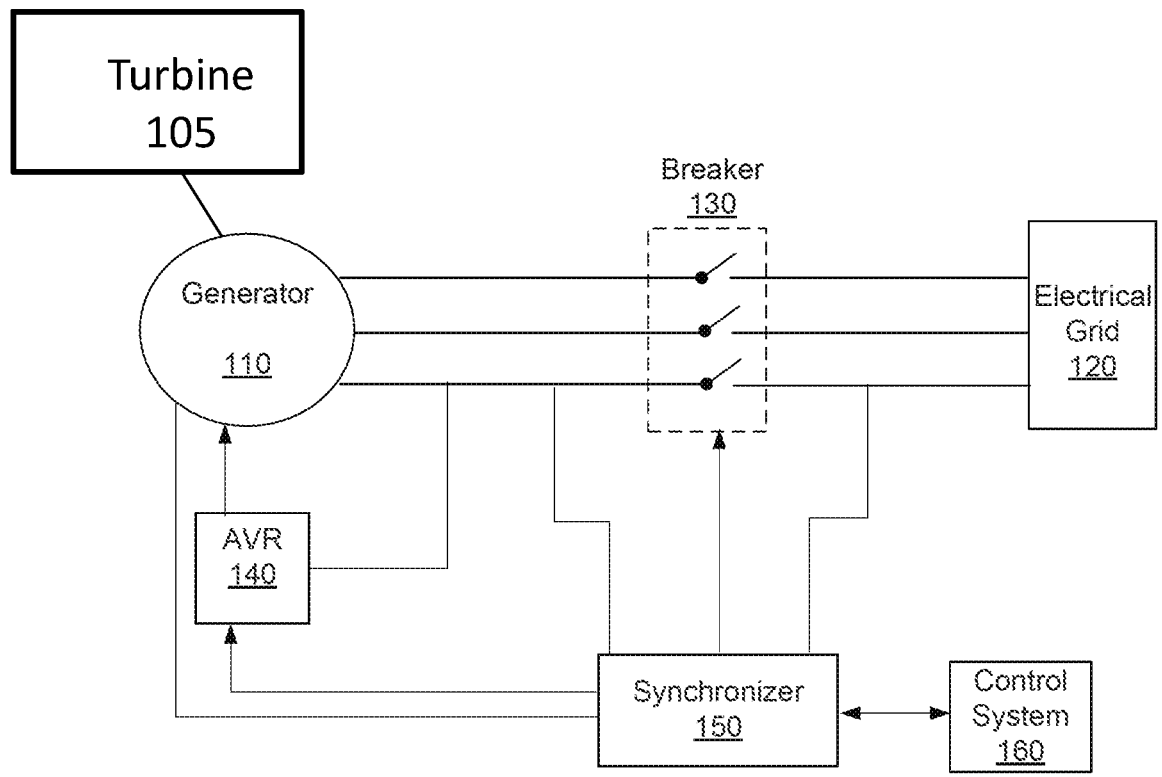

Having thus described the disclosure in general terms, reference will now be made to the accompanying drawings, which are not necessarily drawn to scale, and wherein:

FIG. 1 is a block diagram illustrating an example environment in which certain systems and methods for first time synchronization of a generator with an electrical grid, according to an example embodiment of the disclosure.

Figure 2:
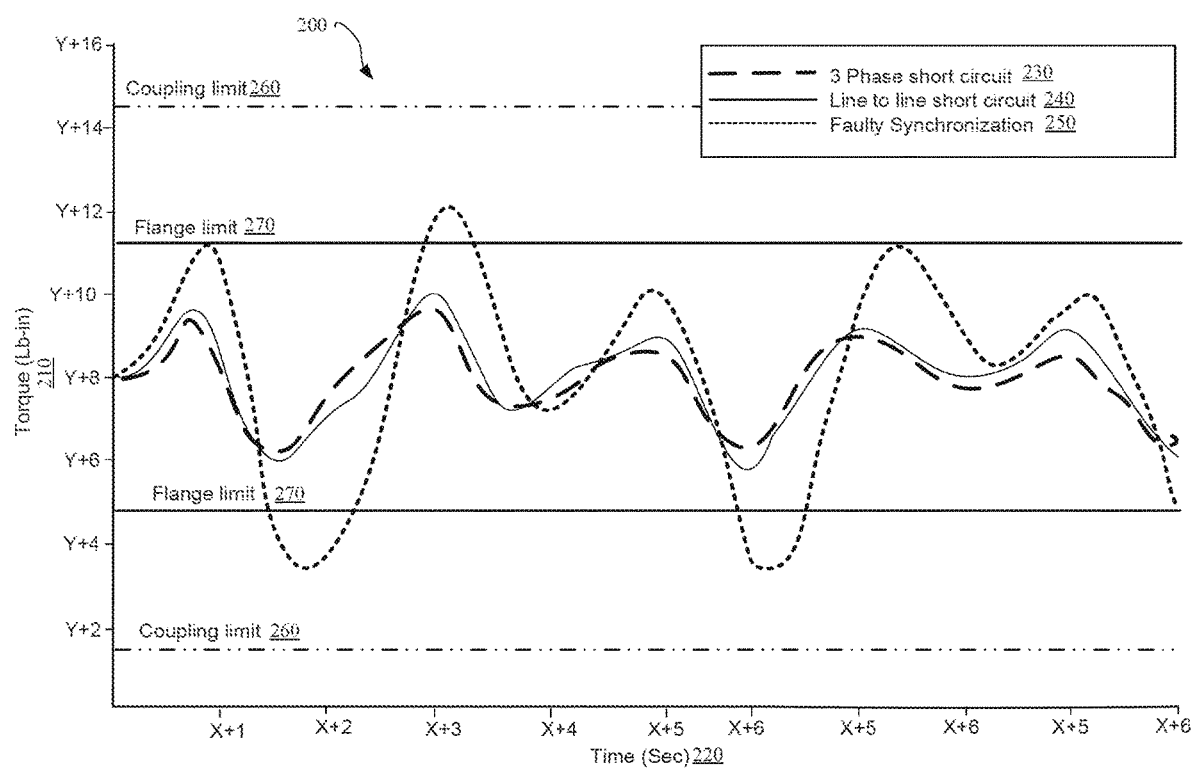

FIG. 2 illustrates an example torque limit curve for an example implementation of systems and methods for first time synchronization of a generator with an electrical grid, according to an example embodiment of the disclosure.

Figure 3:
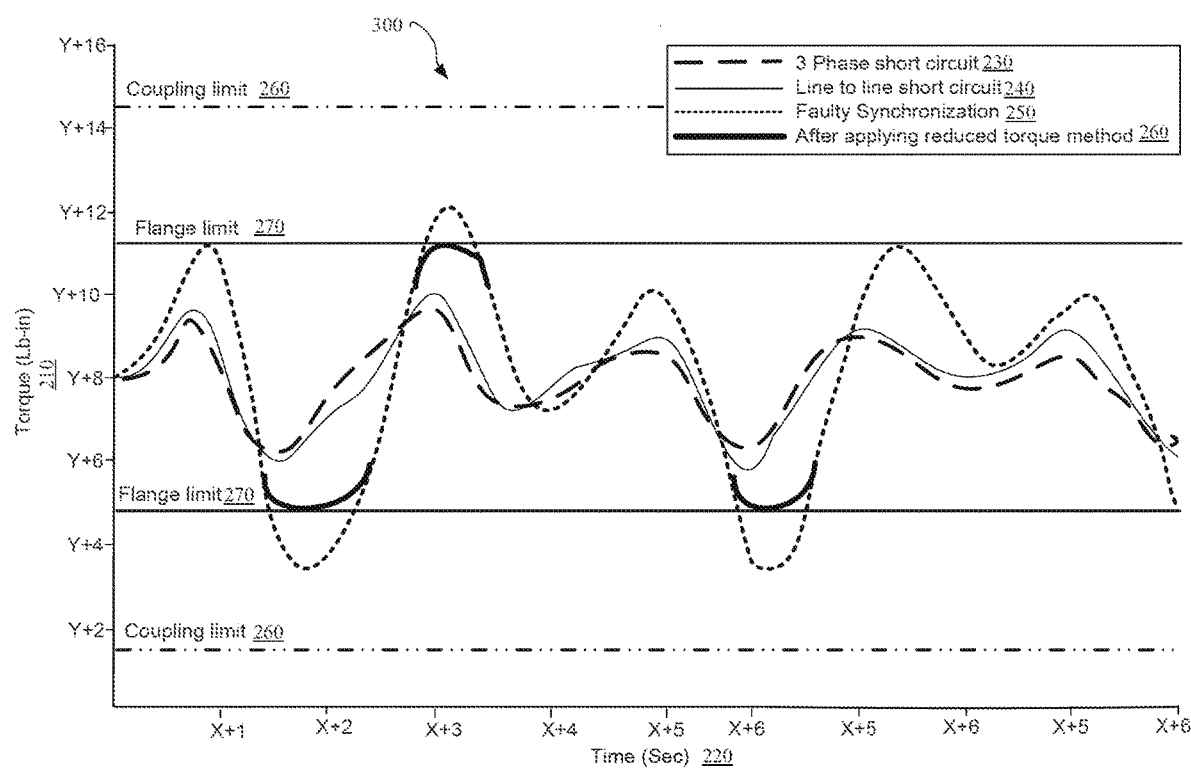

FIG. 3 illustrates another example torque limit curve for an example implementation of systems and methods for first time synchronization of a generator with an electrical grid, according to an example embodiment of the disclosure.

Figure 4:
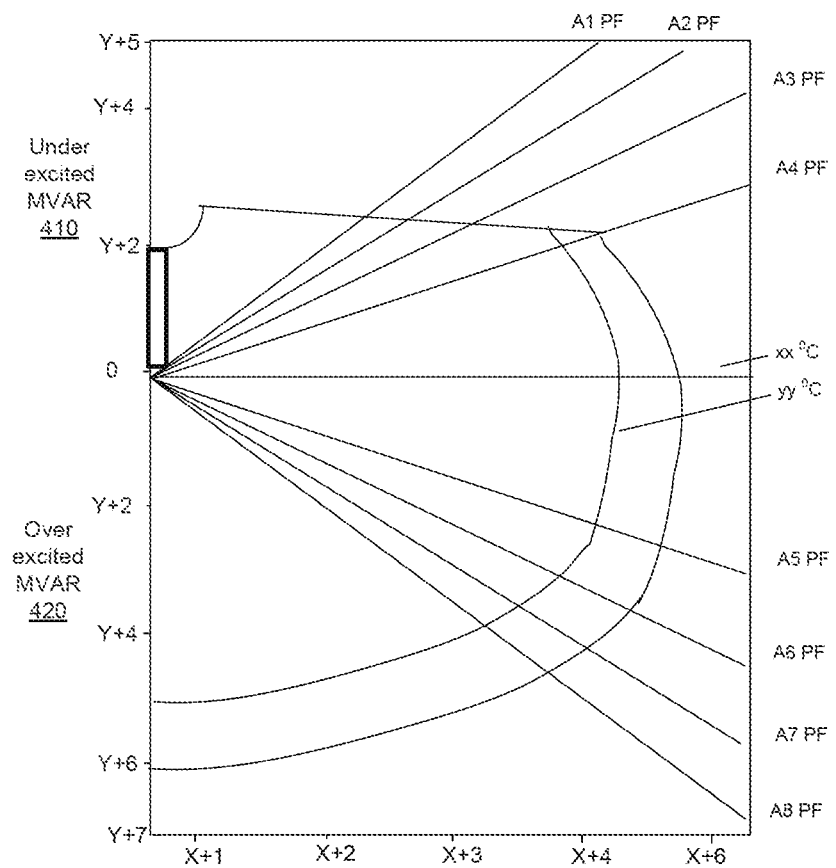

FIG. 4 illustrates an example generator capability curve in an example implementation of systems and methods for first time synchronization of a generator with an electrical grid, according to an example embodiment of the disclosure.

Figure 5:
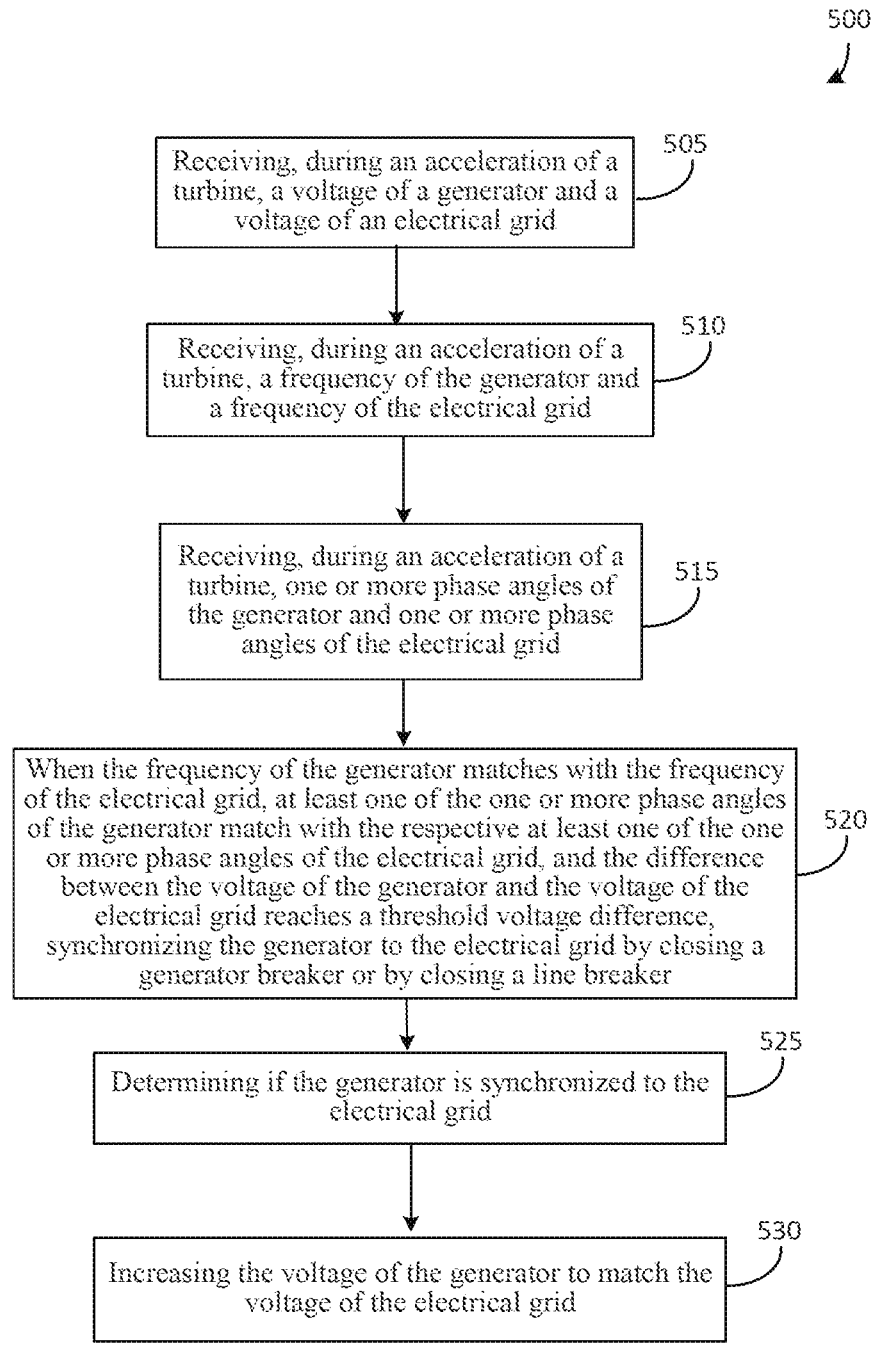

FIG. 5 is a flow chart illustrating an example method for first time synchronization of a generator with an electrical grid, according to an example embodiment of the disclosure.

Figure 6:
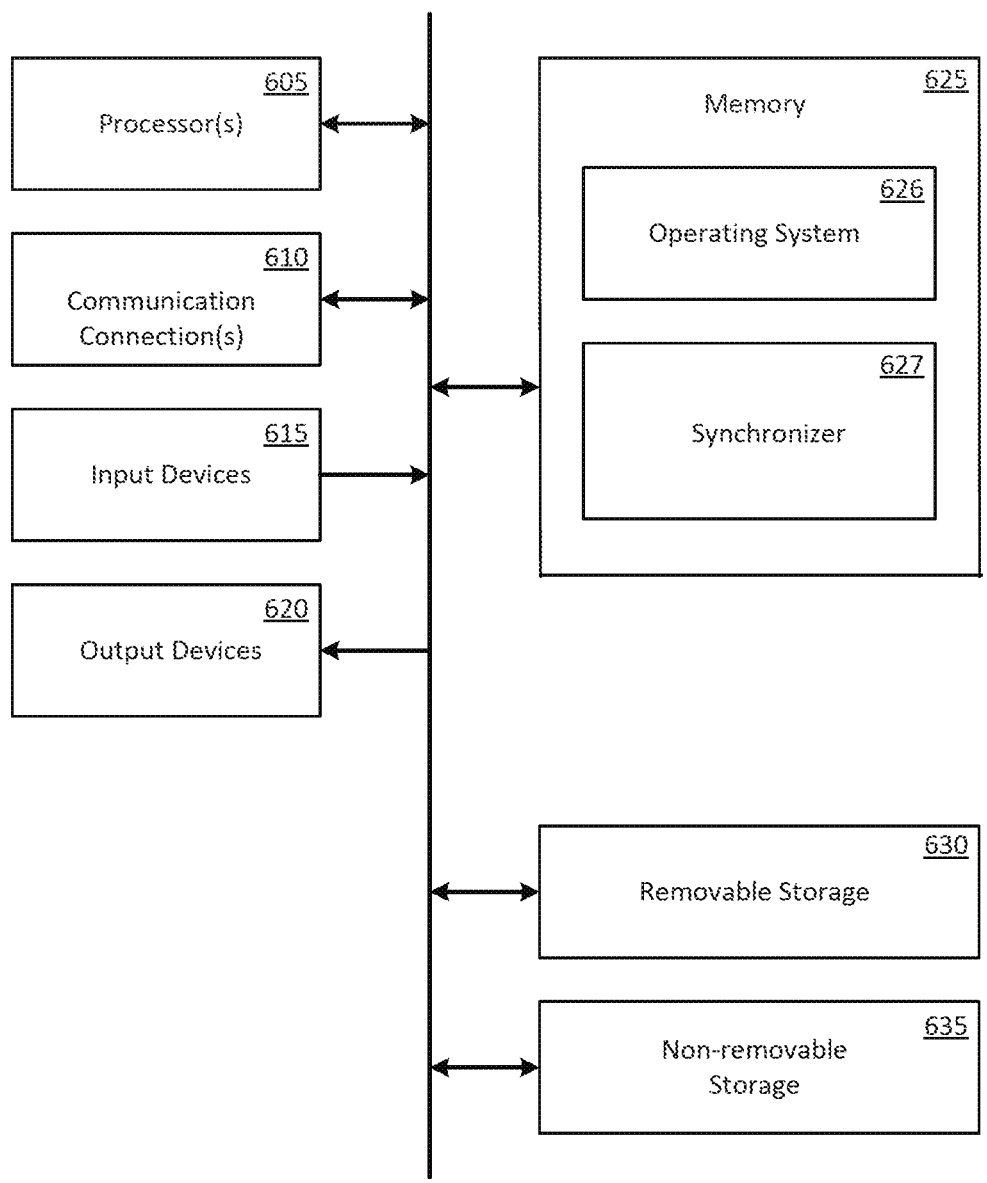

FIG. 6 is an example controller in which certain systems and methods for first time synchronization of a generator with an electrical grid can be implemented, according to an example embodiment of the disclosure.

DETAILED DESCRIPTION

The following detailed description includes references to the accompanying drawings, which form part of the detailed description. The drawings depict illustrations, in accordance with example embodiments. These example embodiments, which are also referred to herein as "examples," are described in enough detail to enable those skilled in the art to practice the present subject matter. The example embodiments may be combined, other embodiments may be utilized, or structural, logical, and electrical changes may be made, without departing from the scope of the claimed subject matter. The following detailed description is, therefore, not to be taken in a limiting sense, and the scope is defined by the appended claims and their equivalents. Like numbers refer to like elements throughout.

Certain embodiments described herein relate to systems and methods for first time synchronization of a generator with an electrical grid. For example, as will be described in greater detail herein, a voltage of a generator and a voltage of an electrical grid can be received during an acceleration of a turbine. Also, during the acceleration of the turbine, a frequency of the generator and a frequency of the electrical grid may be received. Furthermore, during acceleration of the turbine, one or more phase angles of the generator and one or more phase angles of the electrical grid can be received. When the frequency of the generator matches with the frequency of the electrical grid, at least one of the one or more phase angles of the generator match with the respective at least one of the one or more phase angles of the electrical grid, and the difference between the voltage of the generator and the voltage of the electrical grid reaches a threshold voltage difference, the generator can be synchronized to the electrical grid by closing a generator breaker or by closing a line breaker. Also, it may be determined if the generator may be synchronized to the electrical grid. Furthermore, the voltage of the generator may be increased to match the voltage of the electrical grid.

One or more technical effects associated with certain embodiments herein may include, but are not limited to, a decrease in fault torque during synchronization of the generator with the electrical grid. Additionally, generator shaft design may be tailored for lower fault torques, enabling lower cost and safer designs. The following provides a detailed description of various example embodiments related to systems and methods for first time synchronization of a generator with an electrical grid.

FIG. 1 depicts an example system 100 to implement certain systems and methods for first time synchronization of a generator 110 with an electrical grid 120. According to an example embodiment of the disclosure, the system 100 may include a generator 110 that may be driven by a turbine 105, such as a gas turbine or a steam turbine. On the electrical side, the generator 110 may be coupled to an electrical grid 120 via a breaker 130. FIG. 1 indicates the breaker 130 in an open position, and hence the generator 110 may not be connected to the electrical grid 120. In a different embodiment of the current disclosure, the breaker 130 may be in a closed position, and hence the generator 110 may be connected to the electrical grid 120. The example system 100 of FIG. 1 can further include a synchronizer 150, that may measure frequency, voltage and phase angle between the electrical grid 120 and the generator 110. Prior to synchronization of the generator 110 with the electrical grid 120 via breaker 130 closure, the synchronizer 150 may match a frequency of the electrical grid 120 with a frequency of the generator 110, a voltage of the generator 110 with a voltage of the electrical grid 120, and one or more phase angles of the generator 110 with one or more phase angles of the electrical grid 120. The synchronizer 150 may utilize one or more transformers (not shown) in matching parameters across the generator 110 and the electrical grid 120. Furthermore, the synchronizer 150 may direct an automatic voltage regulator (AVR) 140 to match the voltage associated with the generator 110 with the voltage of the electrical grid 120. The synchronizer 150 may be further connected to a controller, such as a control system 160 shown in FIG. 1. The control system 160 may provide inputs to the synchronizer 150 and receive outputs from the synchronizer 150, the generator 110 and/or the electrical grid 120.

The controller 160 can be in communication with the synchronizer 150 and/or the generator 120 as well as the electrical grid 120. The controller 160 can also receive input from power plant operators. Furthermore, the controller 160 can receive data, such as, for example, voltage data, frequency data, and so on.

According to an embodiment of the disclosure, the system 100 of FIG. 1 can include the controller 160 and a memory with computer-readable instructions that can receive, during an acceleration of a turbine 105, a voltage of a generator 110 and a voltage of an electrical grid 120. The controller 160 can further receive, during an acceleration of the turbine 105, a frequency of the generator 110 and a frequency of the electrical grid 120. The controller can further receive, during an acceleration of the turbine 105, one or more phase angles of the generator 110 and one or more phase angles of the electrical grid 120. When the frequency of the generator 110 matches with the frequency of the electrical grid 120, the one or more phase angles of the generator 110 match with the respective one or more phase angles of the electrical grid 120, and the difference between the voltage of the generator 110 and the voltage of the electrical grid 120 reaches a threshold voltage difference (Vthreshold), the generator 110 may be synchronized to the electrical grid 120 by closing a generator breaker 130 or by closing a line breaker (not shown).

In an example embodiment, the threshold voltage difference (Vthreshold) between the voltage of the generator 110 and that of the electrical grid 120 may be in a range of about 1 to about 20% of the voltage of the electrical grid 120. According to certain embodiments of the disclosure, the example range of Vthreshold indicated above may vary, and may be higher or lower than the range specified herein.

Since first time synchronization of the generator 110 to the electrical grid 120 may occur with a Vthreshold that determines a voltage difference between the voltage of the generator 110 and the electrical grid 120, torque impact of faulty synchronization may be limited. In an example embodiment of the disclosure, prior to the generator 110 synchronization with the electrical grid 120, the Vthreshold may include a predetermined Vthreshold to limit a drive train fault torque. The predetermined Vthreshold to limit the drive train fault torque may be based on computer simulations and/or prior field experience with various drive train fault torque scenarios. In another example embodiment of the disclosure, prior to the generator 110 synchronization with the electrical grid 120, the Vthreshold may include a real-time Vthreshold to limit the drive train fault torque. The real-time Vthreshold may be determined by the controller 160 based on operating conditions of the generator 110, ambient temperature, torque limits, and so on.

The controller 160 can additionally determine the generator 110 may be synchronized to the electrical grid 120. If it is determined that the generator 110 is synchronized to the electrical grid 120, the voltage of the generator 110 may be increased to match the voltage of the electrical grid 120. The turbine 105 associated with the generator 110 can then start transmitting power to the electrical grid 120.

The computer-readable instructions associated with the controller 160 may further include instructions to synchronize the generator 110 to the electrical grid 120 automatically or synchronize the generator 110 to the electrical grid 120 manually. In an example embodiment of the disclosure, first time synchronization of the generator 110 to the electrical grid 120 may be performed manually to account for various possible anomalies, such as, for example, faulty wiring, out of phase voltages, and so on. In other example embodiments of the disclosure, first time synchronization of the generator 110 to the electrical grid 120 may be performed automatically. In this case, the controller 160 may direct the Vthreshold, the synchronizer 150 and the AVR 140 such that the first time synchronization can proceed automatically.

In an example embodiment of the disclosure, the computer-readable instructions associated with the controller 160 including instructions to synchronize the generator 110 to the electrical grid 120 may further include a synchronizer 150 that may be an auto synchronizer with a closing angle of about +/−1 degree, about +/−2 degrees, about +/−3 degrees, and so on.

In another example embodiment of the disclosure, the computer-readable instructions associated with the controller 160 including instructions to synchronize the generator 110 to the electrical grid 120 may further include using one or more synchronization check relays that may confirm that all the one or more phase angles of the generator 110 are in synchronization with the respective one or more phase angles of the electrical grid 120 prior to closing the generator breaker 130. For example, this may include checking and confirmation for single phase, 2-phase and 3-phase synchronization.

In another example embodiment of the disclosure, the computer-readable instructions associated with the controller 160 including instructions may further include using an automatic voltage regulator (AVR), such as 140, to limit reactive power resulting from the threshold voltage difference (Vthreshold) during synchronization of the generator 110 with the electrical grid 120. As described in FIG. 1, the synchronizer 150 may direct the AVR 140 to keep Vthreshold such that the resulting reactive power may not exceed allowable limits of the generator 110.

Attention is now drawn to FIG. 2, which depicts an example torque limit curve 200 in accordance with an example embodiment of systems and methods for first time synchronization of a generator with an electrical grid. As shown in FIG. 2, the torque limit curve depicts torque 210 as a function of time 220. Torque 210 may be in units of pound-inches (Lb-in) as indicated in FIG. 2 or in any other units of torque. The torque limit curve 200 indicates examples of torque experienced by a drive train for three different example fault scenarios: a 3 phase short circuit 230, line to line short circuit 240, and faulty synchronization 250. Also indicated are an example flange limit 270 and an example coupling limit 260.

Referring again to FIG. 2, the example torque limit curve 200 that is shown may indicate a polynomial function of torque 210 and time 220 that can be of any order, for example, a first order polynomial, a second order polynomial, a third order polynomial, and so on. In other embodiments, torque 210 and time 220 may be depicted in the form of one or more look-up tables or in the form of discrete values input by an operator.

Referring again to FIG. 2, the highest toque exceeding the flange limit 270 may be experienced during a faulty synchronization 250 situation. The other fault scenarios, including 3 phase short circuit 230 and line to line short circuit 240 may not produce fault torques that exceed flange limit 270.

Attention is now drawn to FIG. 3, where another example torque curve 300 can be depicted in accordance with an example embodiment of systems and methods for first time synchronization of a generator with an electrical grid. The example torque curve 300 may be identical to example torque curve 200 except for the curve indicating application of the reduced torque method 260. During synchronization, Vthreshold may be of such magnitude that the torque may be reduced below the flange limit 270.

Referring now to FIG. 4, an example generator capability diagram 400 is depicted, in accordance with an example embodiment of systems and methods for first time synchronization of a generator with an electrical grid. The generator capability diagram depicts reactive power measured in MVARs (Mega Volt-Ampere Reactives) during the synchronization process. As indicated in FIG. 4, the reduced torque achieved during synchronization with a Vthreshold difference between the generator 110 and the electrical grid 120 may result in instant negative VAR (Volt-Ampere Reactive) load, but may result in overall lower torque during faulty synchronization events. The AVR 140 described in FIG. 1 may limit VAR load during the faulty synchronization event, and protect equipment based on the limits shown in the generator capability diagram 400. Generator capability for two different temperature ranges are depicted in FIG. 4. As desired, certain embodiments of the disclosure may include more or fewer temperature ranges than are illustrated in FIG. 4, and FIG. 4 depicts two temperature ranges xx ° C. and yy ° C. by way of example only.

Referring now to FIG. 5, a flow diagram of an example method 500 for first time synchronization of a generator with an electrical grid, according to an example embodiment of the disclosure. The method 500 may be utilized in association with various systems, such as the system 100 illustrated in FIG. 1.

The method 500 may begin at block 505. At block 505, during an acceleration of a turbine 105, a voltage of a generator 110 and a voltage of an electrical grid 120 may be received. Next, at block 510, the method 500 may receiving, during an acceleration of the turbine 105, a frequency of the generator 110 and a frequency of the electrical grid 120. At block 515, the method 500 may further include receiving, during an acceleration of a turbine 105, one or more phase angles of the generator 110 and one or more phase angles of the electrical grid 120.

Next at block 520, the method 500 may further include synchronizing the generator 110 to the electrical grid 120 by closing a generator breaker 130 or by closing a line breaker, when the frequency of the generator 110 matches with the frequency of the electrical grid 120, at least one of the one or more phase angles of the generator 110 match with the respective at least one of the one or more phase angles of the electrical grid 120, and the difference between the voltage of the generator 110 and the voltage of the electrical grid 120 reaches a threshold voltage difference (Vthreshold). At block 525, the method may include determining if the generator 110 may be synchronized to the electrical grid 120.

Further, at block 530, the method 500 may include increasing the voltage of the generator 110 to match the voltage of the electrical grid 120.

Attention is now drawn to FIG. 6, which illustrates an example controller 160 configured for implementing certain systems and methods for first time synchronization of a generator with an electrical grid, in accordance with certain embodiments of the disclosure. The controller can include a processor 605 for executing certain operational aspects associated with implementing certain systems and methods for first time synchronization of a generator with an electrical grid in accordance with certain embodiments of the disclosure. The processor 605 can be capable of communicating with a memory 625. The processor 605 can be implemented and operated using appropriate hardware, software, firmware, or combinations thereof. Software or firmware implementations can include computer-executable or machine-executable instructions written in any suitable programming language to perform the various functions described. In one embodiment, instructions associated with a function block language can be stored in the memory 625 and executed by the processor 605.

The memory 625 can be used to store program instructions that are loadable and executable by the processor 605 as well as to store data generated during the execution of these programs. Depending on the configuration and type of the controller 160, the memory 625 can be volatile (such as random access memory (RAM)) and/or non-volatile (such as read-only memory (ROM), flash memory, etc.). In some embodiments, the memory devices can also include additional removable storage 630 and/or non-removable storage 635 including, but not limited to, magnetic storage, optical disks, and/or tape storage. The disk drives and their associated computer-readable media can provide non-volatile storage of computer-readable instructions, data structures, program modules, and other data for the devices. In some implementations, the memory 625 can include multiple different types of memory, such as static random access memory (SRAM), dynamic random access memory (DRAM), or ROM.

The memory 625, the removable storage 630, and the non-removable storage 635 are all examples of computer-readable storage media. For example, computer-readable storage media can include volatile and non-volatile, removable and non-removable media implemented in any method or technology for storage of information such as computer-readable instructions, data structures, program modules or other data. Additional types of computer storage media that can be present include, but are not limited to, programmable random access memory (PRAM), SRAM, DRAM, RAM, ROM, electrically erasable programmable read-only memory (EEPROM), flash memory or other memory technology, compact disc read-only memory (CD-ROM), digital versatile discs (DVD) or other optical storage, magnetic cassettes, magnetic tapes, magnetic disk storage or other magnetic storage devices, or any other medium which can be used to store the desired information and which can be accessed by the devices. Combinations of any of the above should also be included within the scope of computer-readable media.

Controller 160 can also include one or more communication connections 610 that can allow a control device (not shown) to communicate with devices or equipment capable of communicating with the controller 160. The controller can also include a computer system (not shown). Connections can also be established via various data communication channels or ports, such as USB or COM ports to receive cables connecting the controller 160 to various other devices on a network. In one embodiment, the controller 160 can include Ethernet drivers that enable the controller 160 to communicate with other devices on the network. According to various embodiments, communication connections 610 can be established via a wired and/or wireless connection on the network.

The controller 160 can also include one or more input devices 915, such as a keyboard, mouse, pen, voice input device, gesture input device, and/or touch input device. It can further include one or more output devices 620, such as a display, printer, and/or speakers.

In other embodiments, however, computer-readable communication media can include computer-readable instructions, program modules, or other data transmitted within a data signal, such as a carrier wave, or other transmission. As used herein, however, computer-readable storage media do not include computer-readable communication media.

Turning to the contents of the memory 625, the memory 625 can include, but is not limited to, an operating system (OS) 626 and one or more application programs or services for implementing the features and aspects disclosed herein. Such applications or services can include a synchronizer module 627 for executing certain systems and methods for first time synchronization of a generator with an electrical grid. The synchronizer module 627 can reside in the memory 625 or can be independent of the controller 160. In one embodiment, the synchronizer module 627 can be implemented by software that can be provided in configurable control block language and can be stored in non-volatile memory. When executed by the processor 605, the synchronizer module 627 can implement the various functionalities and features associated with the controller 160 described in this disclosure.

As desired, embodiments of the disclosure may include a controller 160 with more or fewer components than are illustrated in FIG. 6. Additionally, certain components of the controller 160 may be combined in various embodiments of the disclosure. The controller 160 of FIG. 6 is provided by way of example only.

References are made to block diagrams of systems, methods, apparatuses, and computer program products according to example embodiments. It will be understood that at least some of the blocks of the block diagrams, and combinations of blocks in the block diagrams, may be implemented at least partially by computer program instructions. These computer program instructions may be loaded onto a general purpose computer, special purpose computer, special purpose hardware-based computer, or other programmable data processing apparatus to produce a machine, such that the instructions which execute on the computer or other programmable data processing apparatus create means for implementing the functionality of at least some of the blocks of the block diagrams, or combinations of blocks in the block diagrams discussed.

These computer program instructions may also be stored in a non-transitory computer-readable memory that can direct a computer or other programmable data processing apparatus to function in a particular manner, such that the instructions stored in the computer-readable memory produce an article of manufacture including instruction means that implement the function specified in the block or blocks. The computer program instructions may also be loaded onto a computer or other programmable data processing apparatus to cause a series of operational steps to be performed on the computer or other programmable apparatus to produce a computer implemented process such that the instructions that execute on the computer or other programmable apparatus provide task, acts, actions, or operations for implementing the functions specified in the block or blocks.

One or more components of the systems and one or more elements of the methods described herein may be implemented through an application program running on an operating system of a computer. They also may be practiced with other computer system configurations, including handheld devices, multiprocessor systems, microprocessor based or programmable consumer electronics, mini-computers, mainframe computers, and the like.

Application programs that are components of the systems and methods described herein may include routines, programs, components, data structures, and so forth that implement certain abstract data types and perform certain tasks or actions. In a distributed computing environment, the application program (in whole or in part) may be located in local memory or in other storage. In addition, or alternatively, the application program (in whole or in part) may be located in remote memory or in storage to allow for circumstances where tasks may be performed by remote processing devices linked through a communications network.

Many modifications and other embodiments of the example descriptions set forth herein to which these descriptions pertain will come to mind having the benefit of the teachings presented in the foregoing descriptions and the associated drawings. Thus, it will be appreciated that the disclosure may be embodied in many forms and should not be limited to the example embodiments described above.

Therefore, it is to be understood that the disclosure is not to be limited to the specific embodiments disclosed and that modifications and other embodiments are intended to be included within the scope of the appended claims. Although specific terms are employed herein, they are used in a generic and descriptive sense only and not for purposes of limitation.

The invention claimed is:

1. A method of first time synchronization of a generator with an electrical grid, the method comprising:
  receiving, during an acceleration of a turbine, a voltage of a generator and a voltage of an electrical grid;
  receiving, during an acceleration of the turbine, a frequency of the generator and a frequency of the electrical grid;
  receiving, during an acceleration of the turbine, one or more phase angles of the generator and one or more phase angles of the electrical grid;
  in response to the frequency of the generator received during acceleration matching with the frequency of the electrical grid received during acceleration, at least one of the one or more phase angles of the generator received during acceleration match with the respective at least one of the one or more phase angles of the electrical grid received during acceleration, and a difference between the voltage of the generator received during acceleration and the voltage of the electrical grid received during acceleration reaching a threshold voltage difference, synchronizing the generator to the electrical grid by closing a generator breaker or by closing a line breaker;
  determining the generator is synchronized to the electrical grid; and
  increasing the voltage of the generator to match the voltage of the electrical grid.

2. The method of claim 1, wherein the threshold voltage difference is between 1 to 20% of the voltage of the electrical grid.

3. The method of claim 1, wherein the threshold voltage difference comprises one or more of:
  a predetermined threshold voltage difference to limit a drive train fault torque or a real-time threshold voltage difference to limit the drive train fault torque.

4. The method of claim 1, wherein synchronizing the generator to the electrical grid comprises one or more of:
  synchronizing the generator to the electrical grid automatically or synchronizing the generator to the electrical grid manually.

5. The method of claim 4, wherein synchronizing the generator to the electrical grid automatically comprises:
  using an auto synchronizer configured with +/−1 degree closing angle.

6. The method of claim 1, wherein synchronizing the generator to the electrical grid comprises:
  confirming that all of the one or more phase angles of the generator received during acceleration are in synchronization with the respective one or more phase angles of the electrical grid received during acceleration prior to closing the generator breaker.

7. The method of claim 1, further comprising:
  using an automatic voltage regulator (AVR) to limit reactive power resulting from the threshold voltage difference during synchronization of the generator with the electrical grid.

8. A system comprising:
  a controller; and
  a memory comprising computer-executable instructions operable to:
  receive, during an acceleration of a turbine, a voltage of a generator and a voltage of an electrical grid;
  receive, during an acceleration of the turbine, a frequency of the generator and a frequency of the electrical grid;
  receive, during an acceleration of the turbine, one or more phase angles of the generator and one or more phase angles of the electrical grid;
  in response to the frequency of the generator received during acceleration matching with the frequency of the electrical grid received during acceleration, the one or more phase angles of the generator received during acceleration match with the respective one or more phase angles of the electrical grid received during acceleration, and the difference between the voltage of the generator received during acceleration and the voltage of the electrical grid received during acceleration reaches a threshold voltage difference, synchronize the generator to the electrical grid by closing a generator breaker or by closing a line breaker;
  determine the generator is synchronized to the electrical grid; and
  increase the voltage of the generator to match the voltage of the electrical grid.

9. The system of claim 8, wherein the threshold voltage difference is between 1 to 20% of the voltage of the electrical grid.

10. The system of claim 8, wherein the threshold voltage difference comprises one or more of:
  a predetermined threshold voltage difference to limit a drive train fault torque or a real-time threshold voltage difference to limit the drive train fault torque.

11. The system of claim 8, wherein the computer-executable instructions operable to synchronize the generator to the electrical grid are further operable to:
  synchronize the generator to the electrical grid automatically or synchronize the generator to the electrical grid manually.

12. The system of claim 8, wherein the computer-executable instructions operable to synchronize the generator to the electrical grid are further operable to:
  use an auto synchronizer configured with +/−1 degree closing angle.

13. The system of claim 8, wherein the computer-executable instructions operable to synchronize the generator to the electrical grid are further operable to:
confirm that all of the one or more phase angles of the generator received during acceleration are in synchronization with the respective one or more phase angles of the electrical grid prior to closing the generator breaker.

14. The system claim 8, wherein the computer-executable instructions are further operable to:
use an automatic voltage regulator (AVR) to limit reactive power resulting from the threshold voltage difference during synchronization of the generator with the electrical grid.

15. A non-transitory computer-readable medium comprising instructions executable by a computer for performing operations comprising:
receiving, during an acceleration of a turbine, a voltage of a generator and a voltage of an electrical grid;
receiving, during an acceleration of the turbine, a frequency of the generator and a frequency of the electrical grid;
receiving, during an acceleration of the turbine, one or more phase angles of the generator and one or more phase angles of the electrical grid;
in response to the frequency of the generator received during acceleration matching with the frequency of the electrical grid received during acceleration, the one or more phase angles of the generator received during acceleration match with the respective one or more phase angles of the electrical grid received during acceleration, and the difference between the voltage of the generator received during acceleration and the voltage of the electrical grid received during acceleration reaching a threshold voltage difference, synchronizing the generator to the electrical grid by closing a generator breaker or by closing a line breaker;
determining the generator is synchronized to the electrical grid; and
increasing the voltage of the generator to match the voltage of the electrical grid.

16. The computer-readable medium of claim 15, wherein the threshold voltage difference is between 1 to 20% of the voltage of the electrical grid.

17. The computer-readable medium of claim 15, wherein the threshold voltage difference comprises one or more of:
a predetermined threshold voltage difference to limit a drivetrain fault torque or a real-time threshold voltage difference to limit the drive train fault torque.

18. The computer-readable medium of claim 15, wherein the operation to determine the generator is synchronized to the electrical grid further comprises operations comprising:
using an auto synchronizer configured with +/−1 degree closing angle.

19. The computer-readable medium of claim 15, wherein the operation to determine the generator is synchronized to the electrical grid further comprises operations comprising:
confirming that all of the one or more phase angles of the generator received during acceleration are in synchronization with the respective one or more phase angles of the electrical grid received during acceleration prior to closing the generator breaker.

20. The computer-readable medium of claim 15, wherein the operations further comprise:
using an automatic voltage regulator (AVR) to limit reactive power resulting from the threshold voltage difference during synchronization of the generator with the electrical grid.

\* \* \* \* \*